Aug. 3, 1965

D. K. WINTER 3,198,158

SHIP MANEUVERING SYSTEM AND CONTROL

Filed April 8, 1964

INVENTOR
DUNCAN KENNETH WINTER

BY Frederick W. Turnbull

ATTORNEY

Aug. 3, 1965  D. K. WINTER  3,198,158
SHIP MANEUVERING SYSTEM AND CONTROL
Filed April 8, 1964  8 Sheets-Sheet 2
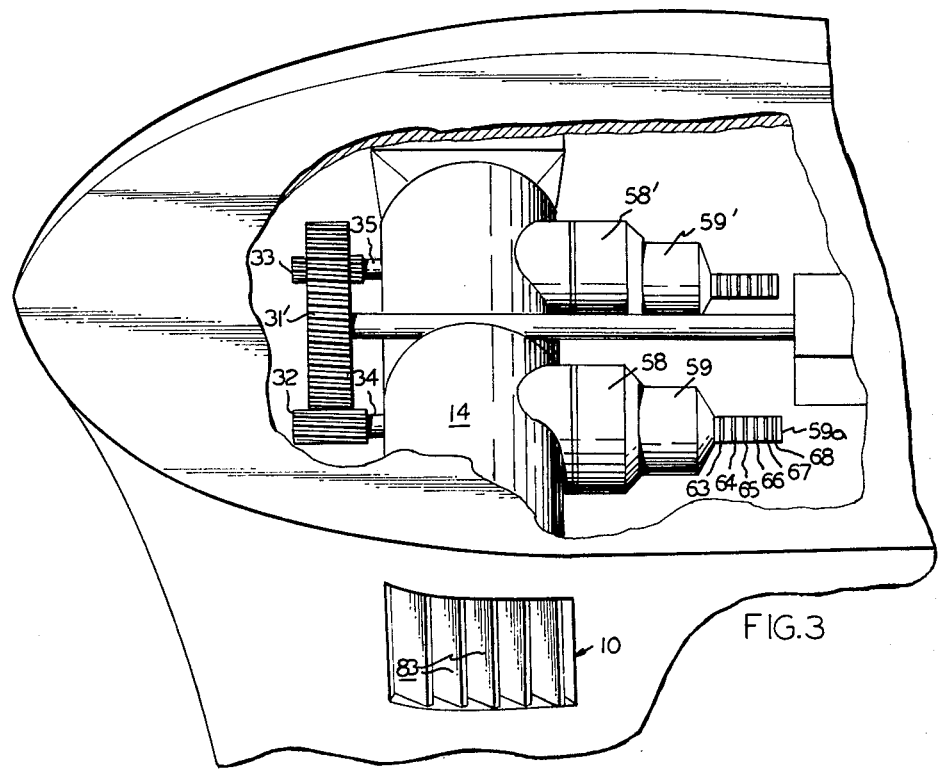
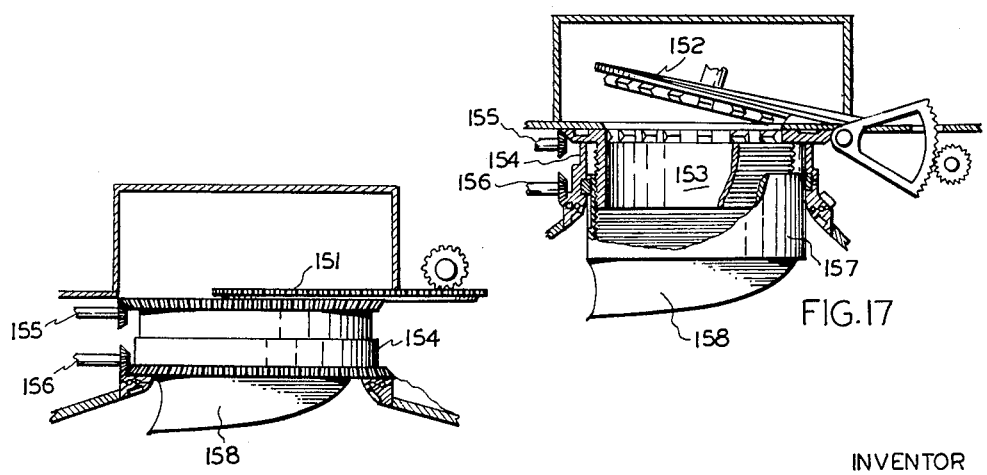
INVENTOR
DUNCAN KENNETH WINTER
BY *Frederick W Turnbull*
ATTORNEY Aug. 3, 1965    D. K. WINTER    3,198,158
SHIP MANEUVERING SYSTEM AND CONTROL
Filed April 8, 1964    8 Sheets-Sheet 3
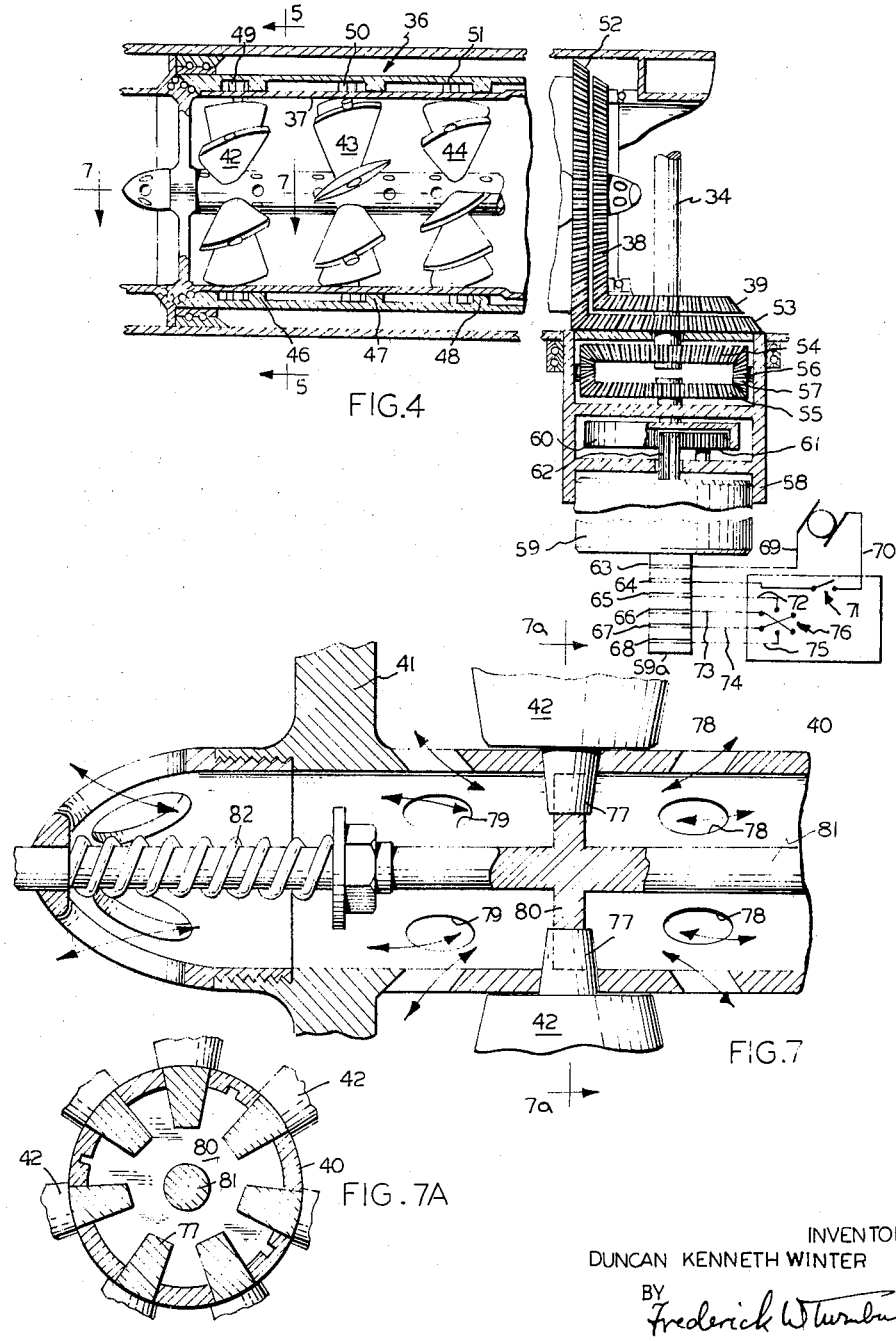
INVENTOR
DUNCAN KENNETH WINTER
BY Frederick W Turnbull
ATTORNEY Aug. 3, 1965   D. K. WINTER   3,198,158
SHIP MANEUVERING SYSTEM AND CONTROL
Filed April 8, 1964   8 Sheets-Sheet 4
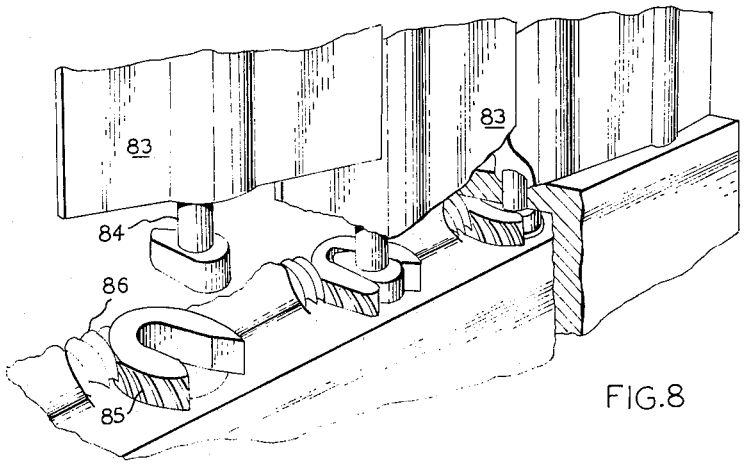
FIG.8
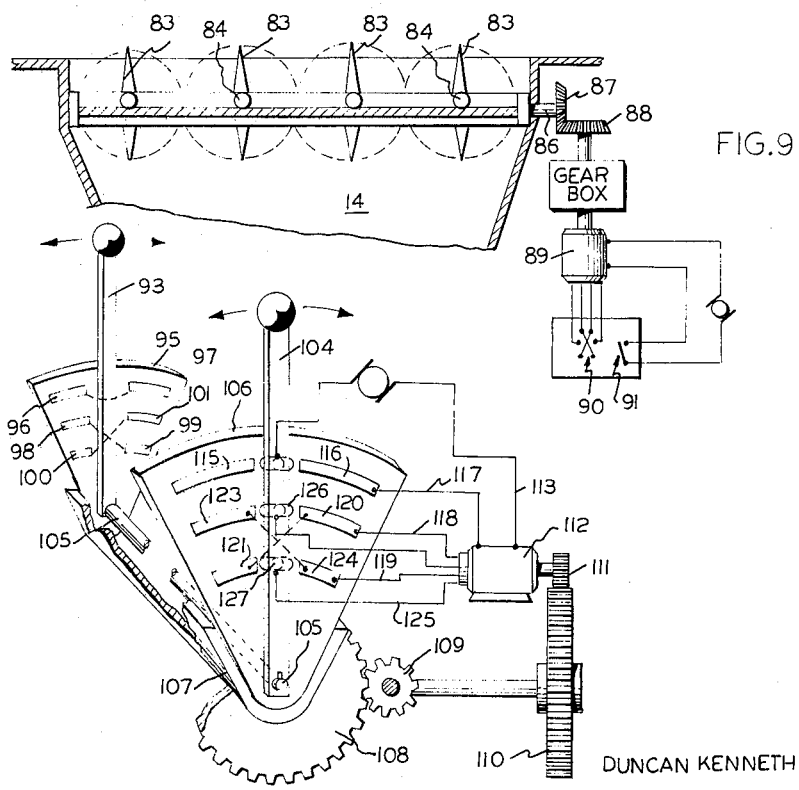
FIG.9
FIG.10
INVENTOR
DUNCAN KENNETH WINTER
BY
Frederick W Turnbull
ATTORNEY Aug. 3, 1965  D. K. WINTER  3,198,158
SHIP MANEUVERING SYSTEM AND CONTROL
Filed April 8, 1964  8 Sheets-Sheet 5

INVENTOR
DUNCAN KENNETH WINTER
BY
Frederick W Turnbull
ATTORNEY

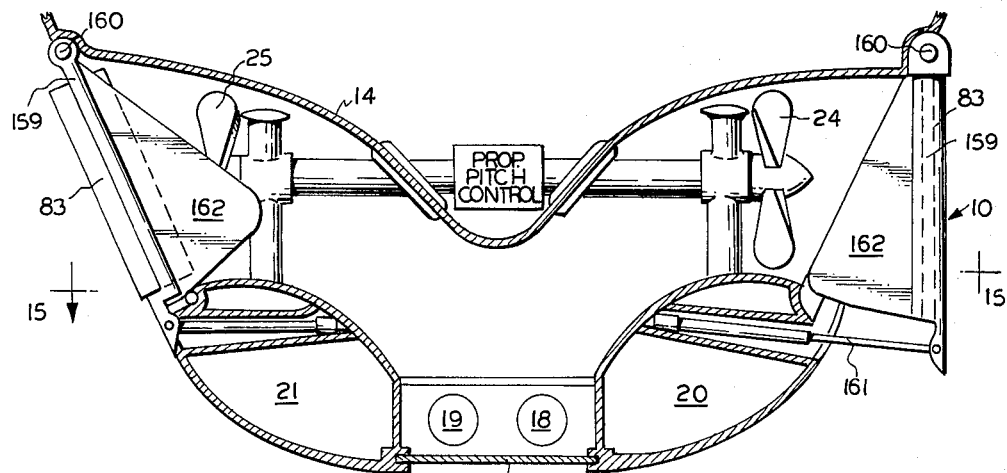
FIG.14
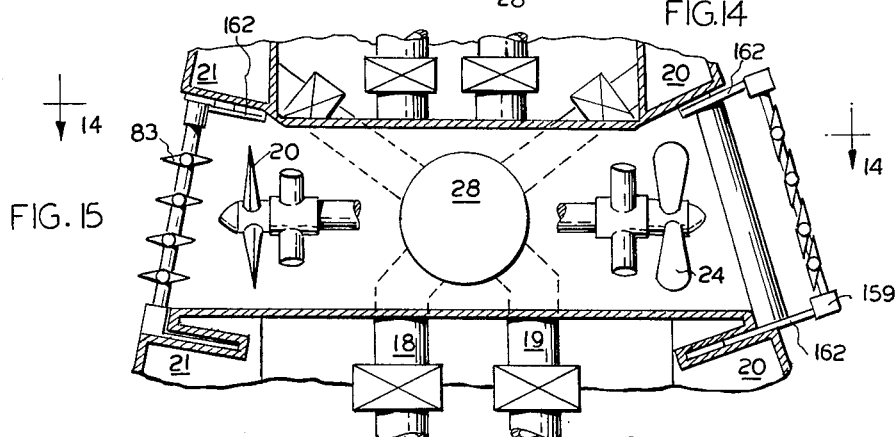
FIG.15
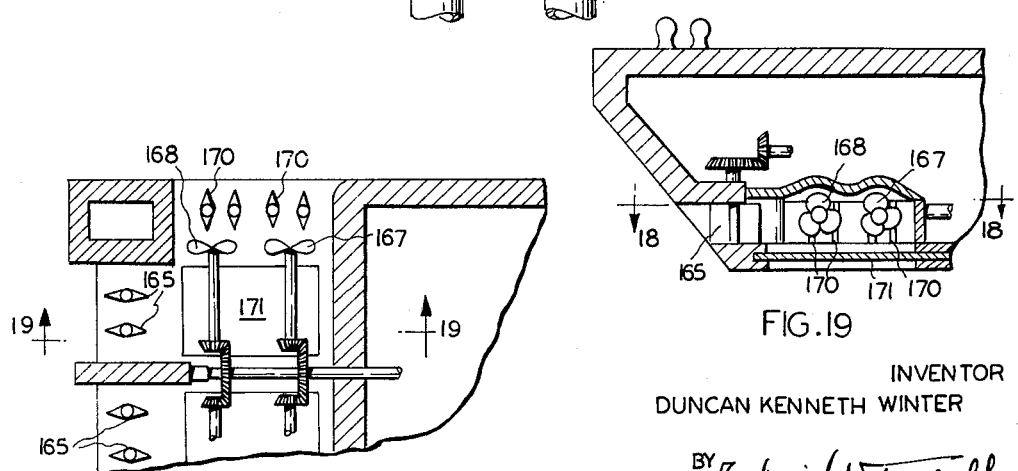
FIG.18
FIG.19
INVENTOR
DUNCAN KENNETH WINTER
ATTORNEY

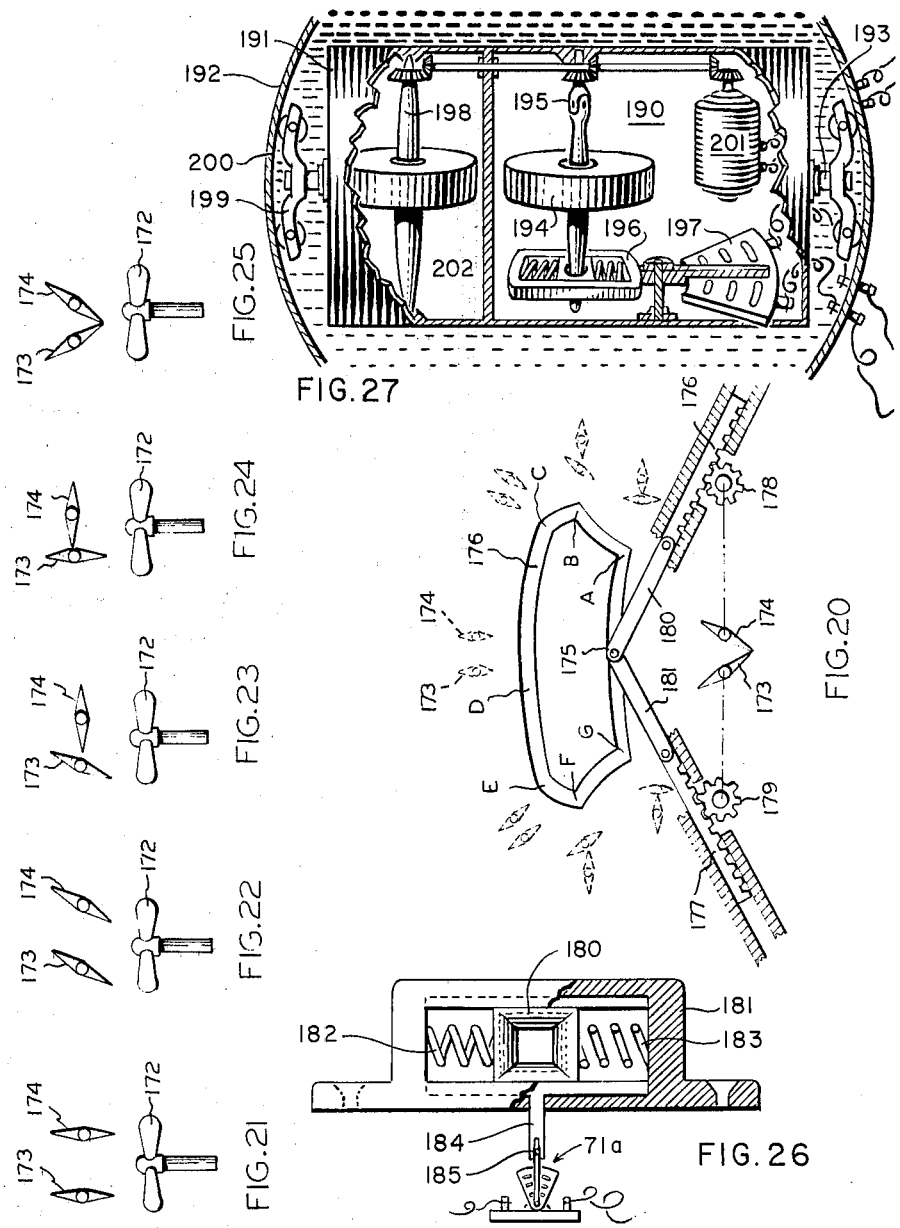

United States Patent Office 3,198,158
Patented Aug. 3, 1965

3,198,158
SHIP MANEUVERING SYSTEM AND CONTROL
Duncan Kenneth Winter, 4614 Maple Ave.,
Bethesda, Md.
Filed Apr. 8, 1964, Ser. No. 358,235
16 Claims. (Cl. 114—151)

The present invention relates to ship propulsion and more specifically to means to give greater and more reliable maneuverability to ships and to means to faciliate navigation especially in congested or limited water areas, and is a continuation-in-part of application Serial No. 239,382, filed September 18, 1962.

Ships in order to be maneuverable must have steerageway, that is, they must be moving at an appreciable speed or they cannot be steered and at low speeds the steering of large ships is not dependable, especially when complicated by winds and water currents. Many proposals have been made to correct this defect but without developing a practical means.

The present invention provides means so that propulsive forces may be applied to the ship at a wide range of angles in addition to the direction of the conventional propulsion force of the ship or the means of the present invention may be used as the sole source of propulsion force for the vessel.

An objective of the present invention is to provide means ancillary to a conventional ship propulsion means to provide propulsion means readily available to provide athwartships propulsive forces at one or both ends of the ship powered, if desired, by the ship's main propulsion power plant.

A further object is to provide control means for said ancillary means to vary the angle of application of the athwartships propulsion forces to provide forward or aft effect of the propulsive forces useful especially in maneuvering a ship in docking.

Yet another object of the present invention is to provide propulsion means usable in narrow and congested waters to give very rapid changes of the forces applied to the vessel both in direction and in intensity.

An incidental object of the invention is to provide additional ship dewatering pumping capacity and to provide for a stream of water to erode sand or mud to free a ship after grounding.

Other and further objects and advantages will appear from the following specification, taken with the accompanying drawing, in which like characters of reference refer to similar parts in the several views, and in which:

FIGURE 3 is a fragmentary broken-away perspective view of the bow of the ship showing one athwartships passage;

FIGURE 4 is a broken-away section of one form of adjustable pitch propeller;

FIGURE 7 is a fragmentary section taken at 7—7 of FIGURE 4;

FIGURE 7a is a fragmentary section taken at 7a—7a of FIGURE 7;

FIGURE 8 is a fragmentary perspective partly exploded showing the louver assembly;

FIGURE 9 is a diagrammatic plan view of the louvers in one of the louvered openings;

FIGURE 10 is a diagrammatic showing of switch means;

FIGURE 14 is a cross-section through the bow athwartships passage of a ship using conventional adjustable pitch propellers and showing water connections thereto;

FIGURE 15 is a section taken at 15—15 of FIGURE 14;

FIGURE 16 is an elevation of a valve with the ships' hull broken away;

FIGURE 17 is a broken-away view of a valve similar to FIGURE 16 with the device extended;

FIGURE 18 is a fragmentary section of a barge taken at line 18—18 of FIGURE 19;

FIGURE 19 is a fragmentary section of a barge taken at line 19—19 of FIGURE 18;

FIGURE 20 is a diagrammatic view of a further exemplification of the invention;

FIGURES 21, 22, 23, 24 and 25 show diagrammatically in plan the motion of the rudders shown in FIGURE 20;

FIGURE 26 is an elevation partly in section of a fairlead for a tow rope to control yawing of a towed barge;

FIGURE 27 shows diagrammatically a gyro-operated instrument to control whip-lash of lengthy barge trains and the like.

Figure 1:
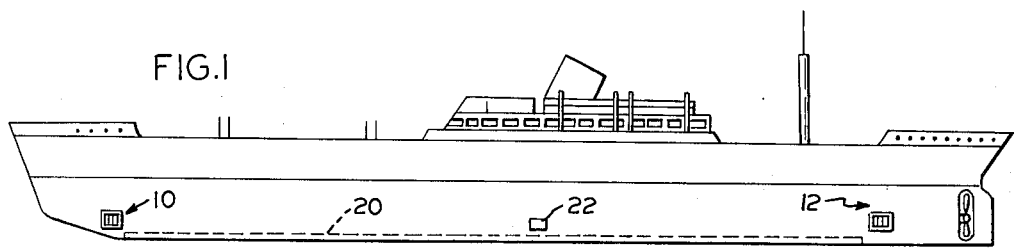
FIGURE 1 is a side view of a ship incorporating the invention.
Figure 2:
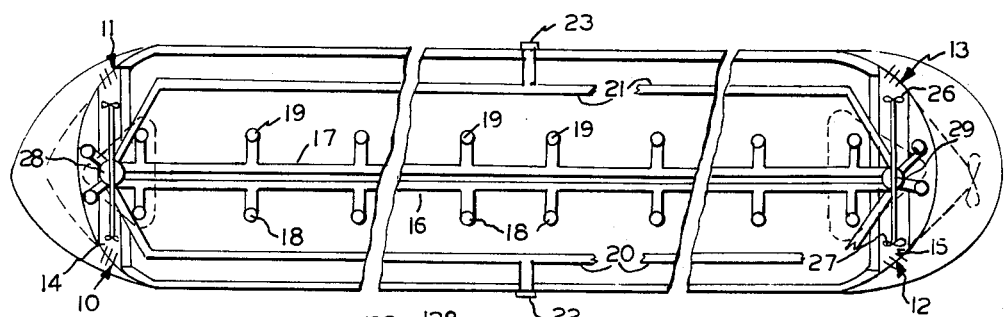
FIGURE 2 is a diagrammatic top view showing the waterways in the ship of FIGURE 1.

In FIGURE 1 of the drawing a ship is seen in profile having a louvered opening 10 at the bow and a louvered opening 12 at the stern. The other side of the ship is provided with a louvered opening 11 and a louvered opening 13 corresponding, respectively, to the openings 10 and 12.

Louvered openings 10 and 11 connect to an athwartships passage 14 at the bow of the ship and louvered openings 12 and 13 connect to an athwartships passage 15 at the stern of the ship. Athwartships passages 14 and 15 are interconnected throughout the length of the ship by waterways 16 and 17 amidship, along which are branch lines terminating in sea valves 18 and 19, the number of such branches depending, of course, on the size of the ship. Water passages 20 and 21 are provided also along the bilges of the vessel which are provided with sea valves 22 and 23, respectively, and may also connect to the ship's holds. The function of these water passageways and valves will be explained more completely below.

The athwartships passage 14 is shown diagrammatically in FIGURES 14 and 15, FIGURE 14 being a view of athwartships passage 14 looking forward and FIGURE 15 being a plan view of passage 14. Passage 15 at the after end of the vessel is of similar configuration. Passage 14 is of a wide V configuration as seen in FIGURE 14 having one end terminating at the louvered opening 10, the other at the louvered opening 11. The base of the V at 28 is provided with a valve means which may be opened to the sea or may be closed. Water passages 16, 17, 20 or 21 may be selectively opened into the base of the V just inboard of the valve at 28. Appropriate gate valves of conventional design may be used for these connections.

Connections 20a and 21a may also be provided so that the propellers 24 and 25 each taking water in through louvers 10 and 11, respectively, and with valve 28 closed, may provide water for decontamination and fire extinguishing.

Conventional adjustable reversible pitch propellers 24, 25 are mounted in the arms of the V adjacent louvered openings 10 and 11, respectively. A means in FIGURES 14 and 15 to control the pitch of these propellers is assumed to be between the arms of the V. It will be understood from a study of FIGURE 14 that propellers 24, 25 may be rotated at no pitch or the pitch of these propellers may be varied from no pitch to a maximum pitch in either direction. With the pitch of both propellers adjusted to thrust water towards their adjacent louvered openings, water may be drawn in through the bottom opening 28 and forcefully ejected port and starboard through louvered openings 10 and 11, respectively. The direction of thrust of the jets of water from louvered openings 10 and 11 will, of course, depend upon the setting of the louvers in these openings and, as will be explained below, the angle of these louvers may be adjusted to deflect the water forward or aft to exert a breaking or an accelerating force upon the vessel.

If both of the adjustable pitch propellers are adjusted to thrust water to starboard, water will be drawn in through louvered opening 10 and will be forcefully expelled through louvered opening 11 and the specific direction of the thrust of this jet of water on the vessel will be controlled by the angular setting of the louvers of louvered opening 11. Similarly the propellers may be adjusted to expel the water to port.

The third situation to be considered is with both propellers 24 and 25 drawing water in through louvered openings 10 and 11, respectively, and forcing it outwardly through the bottom opening 28. It is at once apparent that if the ship is aground, the thrust of water outwardly through the bottom opening 28 will form a bubble of water-under-pressure below the hull of the ship providing an upward thrust on the hull of the ship and also eroding away the sand on which the ship rests.

While a conventional adjustable and reversible variable pitch propeller 24 and 25 may be used, the propeller of FIGURES 4, 5, 6, 7 is preferred.

In the broken away perspective drawing in FIGURE 3, athwartships passage 14 is shown. Shaft 30 coming from a prime mover through a clutch, unnumbered, drives a bull gear 31 just forward of the athwartships passage 14. Bull gear 31 drives pinions 32 and 33 which are mounted on shafts 34 and 35, respectively, which in turn drive the adjustable pitch propeller means 36 and 36' corresponding to propellers 24 and 25 of FIGURES 14 and 15 of which propeller 36 is illustrated in FIGURES 4 through 7.

Figure 5:
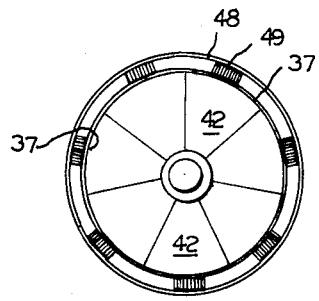
FIGURE 5 is a section taken on line 5—5 of FIGURE 4.
Figure 6:
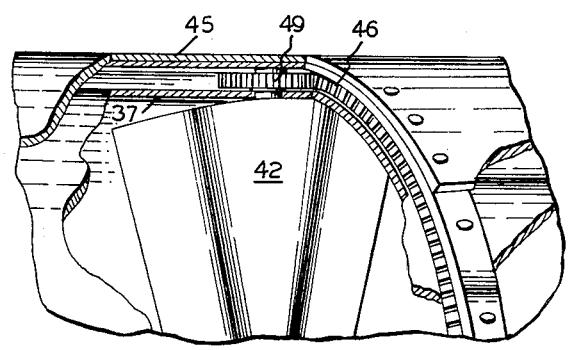
FIGURE 6 is an enlarged fragmentary perspective of a portion of FIGURE 4.

Adjustable pitch propeller 36 comprises a rotatable cylinder 37 which is driven by a bevel gear 38 secured to its inboard end. Bevel gear 38 meshes with a similar bevel gear 39 which is keyed to the drive shaft 34. A hub element 40 carried by a spider 41 rotates with the rotatable cylinder 37. A plurality of blade elements 42 are rotatably mounted in both cylindrical elements 37 and hub element 40, the axis of rotation of each blade being of course a radius of the cylindrical element 37. Other groups of blades 43 and 44 and even more groups if desired, are mounted along the cylindrical element 37. A second rotatable element 45 is mounted exteriorly of and concentric with the cylindrical element 37. Rotatable element 45 has annular inwardly extending ridges 46, 47 and 48, each of which have one side toothed to form an annular rack, the axis of each propeller blade 42 projects through cylindrical element 37 and is keyed to a pinion 49 meshing with the teeth of annular rack 46. It will be understood then, that by rotation of the outer cylindrical elements 45 with respect to the inner cylindrical element 37, each pinion 49 will be rotated about its own axis which is in each case the axis of one blade 42 so that as the two cylindrical elements 37 and 45 rotate with respect to each other the angle of pitch of the blades 42 is varied and adjusted. Similar pinions 50 are mounted on each blade 43 for cooperation with annular rack 47 and similarly pinions 51 on blades 44 coact with annular rack 48. It will be seen, therefore, that the blades of each of the sets of blades 42, 43 and 44 are set and adjusted simultaneously to the same pitch and, as seen in FIGURE 5, the width of the blade is such that each blade may be turned into a common plane without contacting the next adjacent blade and can therefore be adjusted to a selected angle on either side of this common plane. When the blades are rotating in the common plane, there will, of course, be no thrust of water in the athwartships passage 14, in which propeller 36 is mounted. By rotation of outer cylindrical element 45 with respect to the inner cylindrical element 37, however, all of the blades 42, 43 and 44 may be turned to a selected pitch as seen in FIGURE 4, such that, with element 37 rotating in a clockwise direction as seen from the lefthand side of the paper, water will be thrust towards the righthand side of the paper in FIGURE 4.

It is at once clear that with the blades 42, 43 and 44 set as shown in FIGURE 4, it is necessary that the other set as shown in FIGURE 4, it is necesary that the outer cylindrical element 45 turn with the inner cylindrical element 37 as though it were a unit. Yet in order to be adjusted, means must be provided to move the outer cylindrical element 45 with respect to the inner element 37. Such means are shown in the form of a bevel gear 52 meshing with a bevel gear 53. The gear ratio of these two gears 52, 53 are the same as the gear ratio between bevel gears 38 and 39 so that when gear 53 rotates at the same speed as the gear 39 which is keyed to shaft 34, gears 38 and 52 will rotate at the same speed. If, however, gear 53 is rotated with respect to gear 39, gear 52 will then be rotated with respect to gear 58, so that the outer cylindrical element 45 is rotated with respect to the inner cylindrical element 37 and the pitch of the blades 42, 43 and 44 is adjusted.

In order to accomplish such adjustment, a gear 54 which makes up one element of a differential gear system 54, 55, 56, is keyed to the shaft 34. Planet gears 56 are mounted for rotation on the stub shaft 57 mounted securely in a spider 58. A motor 59 is also secured to the spider 58, preferably with its shaft coaxial with shaft 34. Bevel gear 55 of the differential gear system 54, 55, 56 is mounted on a rotatable shaft which is coaxial with shaft 34 and which is connected by a gear system including the ring gear 60, planet gear 61 mounted on the spider and a sun gear 62 mounted on the shaft of motor 59. Other conventional gearing could be employed between the motor 59 and the gear 55.

It will be seen therefore, that when the motor 59 is not running, the gear 55 will not rotate with respect to the spider 58. Planet gears 56 therefore will not rotate so the spider must then rotate at the same speed as gear 54 which is keyed to shaft 34. Bevel gear 53, therefore, which is fixedly secured to spider 58 must rotate at the same speed as gear 39. Therefore, the outer and inner cylindrical elements 37 and 45 will rotate at the same speed and in the same direction. If motor 59 is actuated in either direction it immediately becomes apparent that gear 55 will be rotated with respect to the spider 58 so that through the planet gear 56, the spider will be moved in one direction or the other with respect to the bevel gear 54 so that the bevel gear 53 is moved with respect to the bevel gear 39 and consequently through the intermediary of bevel gears 52 and 38, the outer and inner cylindrical elements 45 and 37 will be rotated with respect to each other.

Figure 12:
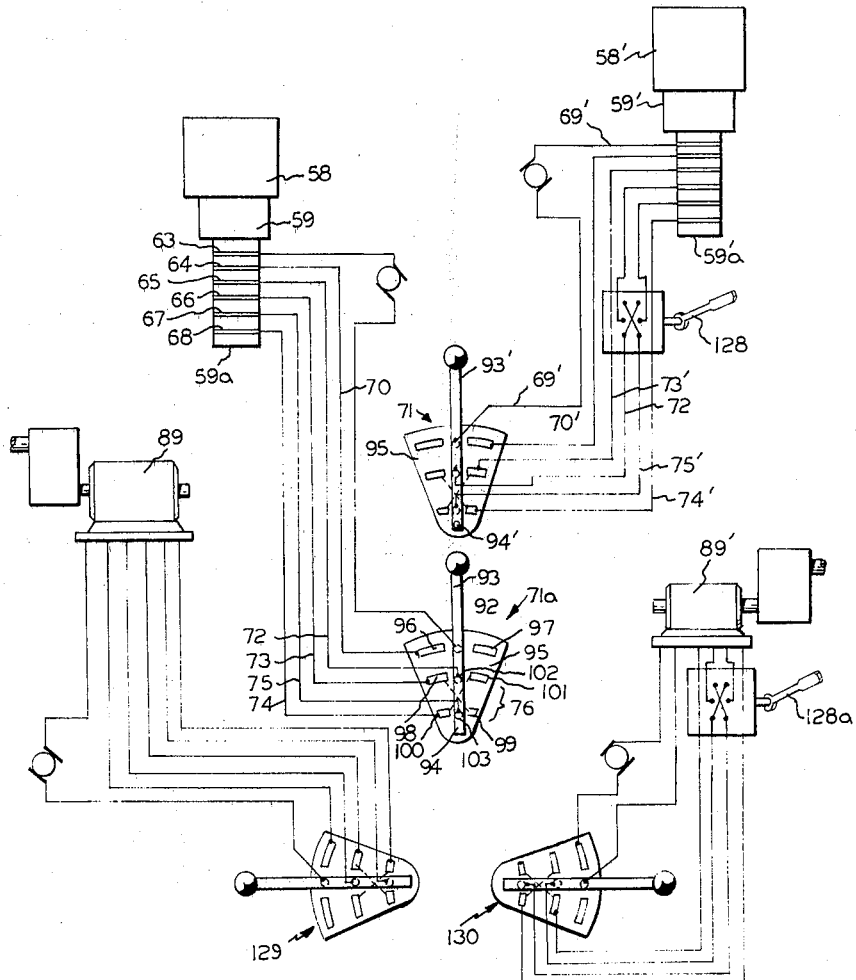
FIGURE 12 is a wiring diagram for the control circuits for one athwartships passage.

A coaxial extension in the form of a cylinder 59a extends from the motor 59 and is encircled with six slip rings 63, 64, 65, 66, 67 and 68 as seen in FIGURE 4 (see also FIGURES 3 and 12). Two of these slip rings 63 and 64 are connected by brushes to electric wires 69 and 70, in one of which is a switch 71. Electric wire 69 leads through a source of electric power. Slip rings 65, 66, 67 and 68 each connect through a brush to wires 72, 73, 74 and 75, respectively, which are appropriately interconnected by a reversing switch 76, which may be a double-throw switch as indicated in FIGURE 4, or, of course, of any other configuration which will change the connection from wire 72 connected to wire 73 and wire 75 connected to wire 74 to having wire 72 connect to wire 74 and wire 73 connect to wire 75. The direction of rotation of motor 59 is dependent upon the position of switch 76. It will be understood, therefore, that by closing reversing switch 76 to require the desired direction of rotation of motor 59 and closing switch 71 to cause motor 59 to rotate, the pitch of blades 42, 43, 44 may be adjusted at will during the rotation of the propeller through shaft 34 via bevel gears 39, 38, 53 and 52.

FIGURE 5, which is a section on line 5—5 of FIGURE 4, shows blades 42 in the no pitch position and it will be seen in this figure that the blades 42 block passage of water through the propeller assembly. It will be appreciated from looking at FIGURE 4 that if water is being impelled at a considerable velocity through the propeller 36 and the blades 42 are rotated into the position of no pitch as shown in FIGURE 5, that there may well develop a pressure differential across the blades 42 and for this reason apertures 78 may be provided in hub element 40 on one side of the blades 42, and apertures 79 may be provided on the other side of blade 42 in the hub. Normally, flow of water along the inner side of hub 40 is prevented by a baffle 80 which is seen in FIGURES 7 and 7a. Assuming water in FIGURE 4 to be moving at a high velocity to the left in that figure and in that of FIGURE 7, and the blades 42, 43 and 44 are suddenly turned to the no pitch position, of FIGURE 5, a pressure will develop on the right hand side of blades 42 in FIGURE 7 and a lower pressure will develop on the left hand side of blades 42 in that figure. This pressure will be equalized by movement of the baffle 80 which is mounted on an axial bar 81 which is normally held in its position shown in FIGURES 7 and 7a by spring 82. The baffle 80 will equalize the pressure regardless of the direction of flow of water through the adjustable pitch propeller 36, as it may move against spring bias in either direction.

Turning to FIGURE 3, the athwartship passage 14 is seen through the broken away deck of the bow of a vessel and the louvered opening 10 is seen in elevation with the louvers in a position to direct the water aft. The spider 58 and the motor 59 are shown in FIGURE 3 which may be compared with the showing in FIGURE 4. A similar spider 58' and motor 59' is shown on the starboard side of the ship, which are connected to the shaft 35 and the pinion 33 in the same way that spider 58 and motor 59 are connected by shaft 34 to the pinion 32. It will be understood that motor 59' may be controlled through a similar circuitry to that shown for motor 59 in FIGURE 4. Further details of the specific circuitry used to control these two motors will be discussed below.

Louvers 83, seen in FIGURE 3, extend vertically across the louvered opening 10 and are also seen in a diagrammatic plan view in FIGURE 9. The number of louvered elements is not important but it is desirable to have them to be of a size that will not cause excessive loading of the parts and will not require excessive power to rotate them about their axes which, as seen in FIGURE 9, is midway between the edges of each louver.

At one end of each louver 83 as seen in FIGURE 8 a shaft 84 cooperatively engages a gear 85 which is driven by a worm shaft 86 which may be rotated in either direction to turn louvers 83 about their axes. Each louver 83 can turn substantially 180° about its axis but is of such an extent that at each end of its motion it contacts the edge of the adjacent louver to present a substantially flat and reasonably tight surface.

Rotation of worm shaft 86 as indicated in FIGURE 9, is caused by rotation of bevel gear 87 keyed thereto which in turn is in mesh with a bevel gear 88, driven by a motor 89 through a suitable gear box. The direction of rotation of motor 89 is controlled by a reversing switch 90 and motor 89 is started and stopped by manipulation of a switch 91 connected in series with a source of electric power. The louvered openings 11, 12 and 13 are each fitted with a set of louvers similar to louvers 83 and are driven by a motor similar to motor 89 through a switch means similar to switches 90, 91.

Taking FIGURE 3 along with FIGURES 4 and 9, it will be immediately apparent that each athwartships passage 14 at the bow or 15 at the stern is provided with four motors two controlling the propellers and two the louvers. Each motor may be selectively rotated in either direction under the influence of appropriate switches. FIGURE 12 shows diagrammatically motors 59, 59' that regulate and adjust the pitch of the propellers in the passage 14 and motors 89 and 89' that adjust the position of the louvers 83 or 83'. Considering first the motor 59 we see that conductor 69 operating through its slip ring, connects motor 59 through a source of electric power to wire 70 which in turn leads to switch 71 and thence back to the second slip ring 64 on the motor 59. One terminal of the switch used in FIGURE 12 in lieu of switch 71 in FIGURE 4 is also numbered 71 and comprises a contact 92 electrically connected to slip ring 63 and mounted on a rod 93 that is pivoted at 94 with respect to a fan-shaped piece of insulating material forming a contact plate 95 on which are located arcuate contact surfaces 96, and 97 which are connected together on the other side of the contact plate 95 and are connected to the second slip ring 64 of motor 59. The contact 92 is normally located between the ends of contact surfaces 96 and 97 so that no electric power is supplied to motor 59 and therefore the motor 59 does not rotate in either direction. If however, the rod 93 is moved, for instance to the left in FIGURE 12 so that contacts 92 and 96 are in electrical contact, energy will be supplied to the motor 59 so it will commence to rotate. As we noted above, in discussing FIGURE 4, the direction of rotation is determined by a reversing switch 76 in FIGURE 4 which is interposed in the circuitry connected to slip rings 65, 66, 67 and 68 by electrical leads 72, 73, 74 and 75. The four poles of the reversing switch connected to leads 73 and 74 are seen in FIGURE 12 at 98, 99, and 100, 101. Poles 98 and 99 are cross-connected on the back of fan-shaped element 95 and are connected to lead 73 and contact plates or poles 100 and 101 are cross-connected across the back and are connected to lead 74. If then, we have moved the handle 93 to the left so that contact 92 is in engagement with 96 to drive the motor, contacts 102 and 103 which are mounted on rod 93 and are connected to leads 72 and 75 will contact plates 98 and 100, respectively, so that the motor will rotate in one direction, perhaps the clockwise direction as seen in FIGURE 12. As long as handle 93a is to the left of center as seen in FIGURE 12, the motor will continue to rotate in the clockwise direction until the handle 93a is again returned to the space between the contacts 96, 97, 98, 101, 100 and 99, respectively.

Considering now that rod 93 in FIGURE 12 has been moved 10° to the left, it will be at once apparent that if the fan-shaped insulating element forming switch plate 95 is rotated about pivot point or shaft 94 to the left 10°, the contacts 92, 102 and 103 will again fall between the contact surfaces on the insulating element 95a and therefore the rotation of motor 59 will stop and will not commence again until the rod 93 is turned on pivot 94 in one or another direction. If rod 93 is then returned to its position shown in FIGURE 12, that is 10° to the right, from its above-described position, contacts 92, 102, 103 will contact contacts 97, 101 and 99, respectively, which will have the effect of rotating the motor 59 in the opposite direction because of the cross-connection of the contacts 98 with 99 and 101 with contact 100. The switching means for motors 59', 89 and 89' are each exactly the same sort of switch as that described above.

Referring now to FIGURE 10, at the left we see in the background the switch discussed above with respect to motor 59 and we see also a second switch which is not shown in FIGURE 12, but which is a part of the switching means. In FIGURE 10, a control rod 104 is keyed to a shaft 105 to which rod 93 is also keyed so that movement of rod 104 also causes movement of rod 93. A fan-shaped insulating switch plate 106 is mounted loosely for rotation on shaft 105 and is connected by a rigid element 107 to the fan-shaped switch plate 95 so that these two fan-shaped elements pivot on shaft 105 as a unit. A gear 108 is secured to element 107 to rotate element 107 and therefore to move switch plates 106 and 95 with respect to rods 104 and 93. Gear 108 is rotated through a gear system 109, 110 and 111 by means of an electric motor 112 which may be called a control motor. Control motor 112 is connected to the switch through a lead 113 through a source of electric power and to a contact 114 on the rod 104. Contact surfaces 115 and 116 are mounted on element 106 and are interconnected on the far side of the insulating element 106 so that whichever direction handle 104 is swung about shaft 105 the control motor will be operated to revolve in one direction or the other. From contacts 115 and 116 a lead 117 completes the basic circuitry for the motor. Leads 118 and 119 each lead to a contact surface on the element 106. Lead 118 leading to contacts 20 and 121 and lead 119 leading to contacts 122 and 123. It is noted that these contacts are arranged so as to form a reversing switch. Leads 124 and 125 are connected to contacts 126 and 127 respectively mounted on handle 104. If, then, handle 104 is moved 10° to the left in FIGURE 10, the control motor 112 will be rotated in such a direction as to rotate gear 108 to the left. When the gear 108 has rotated 10° to the left carrying switch plate 106 with it, the contacts 114, 126 and 127 will again fall between the ends of the several contacts described above, and the control motor will stop. Since rod 93 is keyed to shaft 105 a 10° motion of handle 104 will move rod 93 10° also and since switch plates 106 and 95 are secured for rotation together by element 107, the element 95 will follow the motion of element 93 so that the motor 59 controlled by element 93 will stop simultaneously with motor 112; and when the handle 104 is returned in the opposite direction, the control motor will again move the switch plates 106 and 95a to a position where the contacts again fall between the contact surfaces on the several fan-shaped switch plates.

Referring again to FIGURE 12, motor 59' is controlled by a circuit exactly like the circuit for motor 59 and the various elements of this circuitry are denoted by similar reference numerals with the superscript prime. The variation in the circuitry for motor 59' lies in the provision of a reversing switch 128 which is a simple two-position switch arranged so that motors 59 and 59' may be actuated to rotate in the same direction by movements of rods 93 and 93' in the same direction, or may be actuated to rotate in opposite directions by movement of 93 and 93' in the same direction. The reason for this will appear below.

Figures 11, 11A:
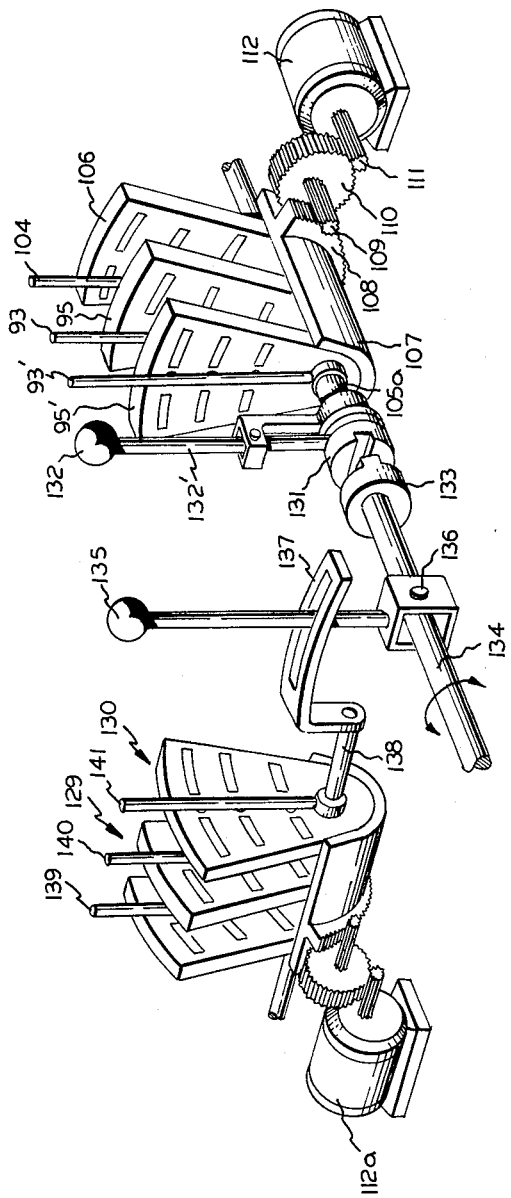
FIGURE 11 is a diagrammatic perspective view of a control switch to control both adjustable pitch propellers and the louvers at each end of an athwartships passage.
FIGURE 11a is a fragmentary perspective of a safety shield to assure proper positioning of one switch when reconnected to the other switch means.

While in FIGURE 10 control motor 112 is shown as controlling the motion of elements 93 and 95, it is intended that elements 93' and 95' will also be controlled. To effect this 93' is also keyed to shaft 105 and element 95' is also rotated by element 107 driven by gear 108 as seen in FIGURE 11. Switches 129 and 130 are in all respects similar to the switches 71 and 71' of FIGURE 12.

Referring now to FIGURE 11 the switch of FIGURE 10 is seen at the right and the switch means for controlling motors 89 and 89' are seen at the left. A handle knob 132 is mounted on a lever 132' that may be used to engage or to disengage dog clutch element 13'. With the dog clutch 13' disengaged, movement of knob 132 in an arc about shaft 105a causes the contact carrying elements 104, 93, and 93' to be swung so that the contacts thereon make electrical contact with the contact plates on fan-shaped elements 106, 95, and 95'. Since the contact 114 on contact carrying rod 104 starts control motor 112 rotating, the fan-shaped elements 106, 95 and 95' are pivoted in the same direction as contact elements 104, 93 and 93' have been swung, by means of gears 111, 110, 109 and 108 which rock element 107 clockwise or anticlockwise according to the movement of contact carrying rod element 104 as explained in connection with FIGURE 10. Switch plates 95 and 95' are clearly seen in FIGURE 11 to be mounted to rock with element 107 and rod elements 104, 93 and 93' are each keyed to the same shaft 105a which is similar to shaft 105 in FIGURE 10. A dog clutch element 131 is mounted on the end of shaft 105a and is axially movable on shaft 105a by means of lever 132'.

As shown in FIGURE 11, therefore (where clutch element 131 is not engaging with its complementary dog clutch element 133), by movement of handle 132 in an arc about shaft 105a, rod elements 104, 93 and 93' may be moved to the right or the left as desired; and upon movement of 104, 93 and 93' motors 59 and 59' will be simultaneously controlled as explained above.

When, however, dog clutch 131 is engaged with dog clutch element 133, which is secured to shaft 134, it will be apparent that by movement of handle 135 in an arc about shaft 134, the elements 104, 93 and 93' will be moved to control the motors 59 and 59'. Handle 132 of course moves with these elements.

Handle 135 is pivoted at 136 to shaft 134 and is engaged by a yoke 137 mounted on a shaft 138 to which are keyed three rod elements 139, 140, 141, corresponding to elements 104, 93 and 93' in connection with the switch apparatus described above. Of these three elements, element 139 may control the control motor 112a, element 140 controls the switch 129 of FIGURE 12 and element 141 controls the switch 130 of FIGURE 12. Shaft 138 is at right angles to shaft 134 and in alignment with shaft pivot 136 when the handle 135 is vertical, so that by swinging handle 135 towards handle 132, for instance, elements 139, 140 and 141 are swung in that direction which actuates motor 112a to move the switch plates 139', 140' and 141' in the same direction and in the same angular distance.

Referring to FIGURE 9, louvers 83 are shown as extending athwartships or, stated differently, in alignment with the passage 14 so that water thrusting outwardly through passage 14 and through louvers 83, is directed in a direction normal to the centerline of the ship. Switches 129 and 130 that control respectively the angle of louvers 83 in the louvered openings 10 and 11 are arranged so that upon thrusting handle 135 towards handle 132 which, for the purposes of discussion, is assumed to be forwardly of the ship, the louvers 83 and the corresponding louvers at louvered opening 11 will swing about their axes in a direction to deflect the water aft, therefore it will provide a forward thrust on the vessel. Similarly, moving handle 135 aft or away from handle 132, the switches 140 and 141 will cause the motor 89 and 89' to rotate the louvers to deflect the water in a forward direction whereby the water will provide a thrust on the ship tending to arrest forward movement or to propel it rearwardly.

It is possible, however, by use of a reversing switch 128' as seen in FIGURE 12 to have the louvers on the port side of the ship swing in one direction while the louvers on the starboard side of the ship swing in the opposite direction. The advantages of this will be described below. Handle 135 may conveniently be called a "joy stick," by analogy to the control lever of an airplane.

Assuming that joy stick 135 is vertical, it is to be understood that the louvers on each louvered opening 10 and 11 are in the position shown in FIGURE 9, and the propeller blades are in a central or on-pitch position, both starboard and port. Assume further that switch 128 is positioned so that when the joy stick is moved to starboard both propellers in athwartships passage 14 assume a pitch to impel water to port and when joy stick 135 is moved to the port, both propellers assume a pitch to impel water to starboard and, as pointed out above, movement of joy stick 135 forward causes the louvers to turn in such a way as to deflect the water aft and when moved aft, the louvers are rotated to deflect the water forward.

Figure 13:
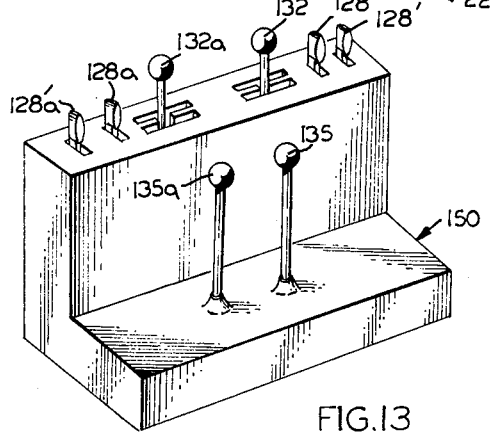
FIGURE 13 is a perspective view of a control stand.

Athwartships passage 15 at the stern is similarly provided with propellers, louvers and switching gear controlled by a joy stick 135a, which along with joy stick 135 is positioned at a control stand as seen in FIGURE 13. Handle 132 and switch handles 128 and 128' are also shown at the control stand and joy stick 135a is similarly provided with a handle 132a and switch handles 128a and 128'. Control stand 150 of FIGURE 13 may be located at any convenient point from which a pilot may con the ship into a slip or a dock.

Assuming a ship to be coming into port, the main engines are stopped, so that the main propeller, normally used to propel the ship while at sea is no longer giving a thrust to the ship. As the ship slows down, steerageway is lost but with the installation of the present invention, the pilot may both steer and maneuver the ship by manipulation of joy sticks 135 and 135a. Various maneuvers may be carried out; for instance, the bow of the ship may be swung starboard by moving joy stick 135 to starboard or to port by moving joy stick 135 to port. If a forward thrust on the ship is desired, both joy sticks 135 and 135a may be pushed forward and even without changing the setting of handles 132a and 132, the joy sticks 135a and 135 may be moved athwartships one direction or the other as dictated by the judgment of the pilot. If it is desired to arrest the ship both joy sticks may be slanted aft and again manipulated to give a thrust out of one or other side of the vessel as determined by the judgment and experience.

If switch handle 128a is moved into its other position, both propellers of the aft athwartships passage 15 will be interlocked so that both propellers will adjust simultaneously under the influence of switches 71 and 71' to impel water either outwardly or inwardly. If then handle 132a is pulled aft to disconnect the dog clutch of the switching gear for the propellers in athwartships passage 15, the propellers of the aft athwartships passage may be set, for instance so that both propellers are thrusting water outwardly through the louvers at louvered openings 12 and 13. If then handle 135a is thrust forwardly, the louvers at louvered openings 12 and 13 will rotate to deflect the water aft and therefore provide a forward thrust upon the ship and, contrariwise, if joy stick 135a is pulled aft, the outflowing water through the louvered openings 12 and 13 will apply a braking force to the ship. It will be seen that one athwarthships passage may be purely for propulsion or breaking while the other is used for maneuvering the vessel sideways.

H-shaped slots are provided in which handles 132 and 132a operate in order that the dog clutches can only be engaged when both propellers are in a no pitch condition. When the vessel has been maneuvered into a position between two quays for instance, it is desirable to use switches 128' and 128a' so that the louvers of the louvered openings in each athwartships passage 14 or 15 operate in opposite directions, while handles 132 and 132a are positioned to engage both dog clutches and switches 128 and 128a are arranged so that both propellers in each athwartships passage impel water in the same direction so that as the joy sticks are moved to starboard the water is impelled to port and vice versa.

The arrangement of switches 128' and 128a' in this arrangement is such that the movement of joy sticks 135 and 135a forward will cause the louvers at louvered openings 11 and 12 to deflect water aft and at louvered openings 10 and 13 to deflect water forward and movement of the joy sticks aft will cause the louvers at louvered openings 10 and 13 to deflect water aft and at louvered openings 11 and 12 to deflect water forward. In order to move the vessel bodily sideways towards one of the quays, it is only necessary to thrust the joy sticks 135 and 135a in the direction in which it is desired for the ship to move. In order to arrest its motion it is only necessary to pull the joy sticks away from the direction in which the vessel is moving, and in order to prevent the ship from bumping the quay, joy sticks would be pulled in a direction away from the quay and thrust to the left of the operator as he faces the quay. The water then from each athwartships passage 14 and 15 will be forced amidships between the broad ship side and the quay to form a cushion.

Switch handles 128 and 128a may be mechanically interlocked with handles 132 and 132a respectively, so that whenever the dog clutches are engaged, both propellers in each athwartships passage impel water in the same direction and when the dog clutches are disengaged, both propellers in each athwartships passage impel water either outwardly of the vessel or inwardly of the vessel.

Referring to FIGURES 14 and 15 and assuming propellers 24 and 25 to be set to draw water in through louvered openings 10 and 11, it will be seen that the center of the V-shaped passage 14 will be under pressure. If the ship is aground and valve 28 is open the water coming in through the louvered openings will be forced out through opening 28, forming a bubble of water under the hull which will both tend to lift the hull of the vessel and to erode away the sand on which the vessel is aground.

Since, however, the vessel may be aground for more than the very limited area of opening 28, the valved passages 16 and 17 may be open to subject these passages to full pressure from the propellers 24 and 25, so that branch lines from waterways 16 and 17 leading to sea valves 18 and 19 are subject to the pressure created by propellers 24 and 25. By opening appropriate sea valves 18 and 19 water pressure can then be used to free the ship after it has been grounded.

Assuming the vessel has been grounded at the forward end, the louvered openings 10 and 11 and the propellers 24 and 25 are set to take in water and to force it down through opening 28 and/or through sea valves 18 and 19 in the area of grounding. Simultaneously the after athwartships passageway 15 may be set with its propellers 26 and 27 set so that both propellers impel water simultaneously either to the starboard or to the port under the control of joy stick 135a. The main ship's propeller may be put in reverse to give the strongest possible thrust to draw the ship off the sand bar and propellers 26, 27 may be manipulated by joy stick 135a to alternately swing the stern of the vessel port and starboard. It will be seen that these maneuvers would free a vessel from most grounding conditions.

Referring to FIGURES 16 and 17, a valve is shown which may be used as sea valves 18 and 19. Any convenient closure means such as a sliding valve element 151 or a pivoted valve element 152 may be used to close off the sea valve. Closure 152 may conveniently be provided with a bayonet type securement. Below closures 151 or 152 are concentric cylindrical elements 153 and 154, cylindrical element 153 being subjected to rotary movement by shaft and bevel gear 155 and the outer cylindrical element 154 being rotatable by shaft and bevel gear 156. An extensible and retractable element 157 is keyed for rotation with and for axial displacement with respect to outer cylindrical element 154 and threadedly engages the outer surface of the inner cylindrical element 153. It will be seen, therefore, that if cylindrical elements 153 and 154 are rotated with respect to each other, the extensible and retractable element 157 will be extended or retracted in accordance with the direction of the relative rotation. Element 157 is not seen in FIGURE 16 as it is retracted. In FIGURE 17, element 157 is extended. It will be noted, then, that if shaft and bevel gears 155 and 156 are rotated in such a manner that the outer element 154 and the inner element 153 rotate together the element 157 will be rotated without being either moved outwardly or inwardly. A water deflecting hood 158 is provided on the outboard end of the extensible element 157 to deflect water, forced outwardly through the sea valve, in a generally horizontal direction so that the jet of water ejected through the element 157 may be used to selectively erode away sand from under the vessel's bottom.

Referring again to FIGURES 14 and 15, it will be seen that the louvered openings 10 and 11 may each be provided with a frame 159 pivoted at the top on a pivot 160 so that the lower end of the frame may be swung outwardly as shown on the right-hand side of FIGURE 14. The movement of this frame 159 is controlled by a means 161 which may be a double-acting piston and cylinder means or may be a screw and nut means. Side panels 162 are provided to close the wedge-shaped opening formed at the ends of the frame 159 when it is swung outwardly. It will be seen in FIGURE 14 that with louvered opening 10 swung outwardly as there shown, with the louvers 83 in frame 159 closed, and with the louvers 83 of louvered opening 11 being open, propellers 24 and 25 may be used to force water outwardly and downwardly through opening 10 to erode away mud or sand on which the forward end of the vessel may be aground.

A variation of the structure seen in FIGURE 3 is seen in FIGURES 18 and 19, which is installation on a barge for use in shoal water, such as in canals or on shallow rivers.

On the Ohio and Mississippi Rivers, tows of barges perhaps a thousand feet long and several barges wide are often assembled and are propelled by a single towboat secured to the after end of the tow. It is at once apparent that the maneuvering of such an unwieldy tow in a crooked river is a problem of greatest importance. By equipping a barge at the forward end of the tow with the structure as seen in FIGURES 18 and 19, the maneuverability of such a tow will be greatly improved. Since such a river is quite shallow it is not desirable to take the water in through the bottom of the barge, so an opening 164 is provided in the end of a barge which is closable by rotatable elements 165 in a manner similar to the closing of the louvered openings 10 and 11 described above. The opening 164 opens into an athwartships passage 166 in which propellers 167 and 168 are shown on the starboard side of the broken-away bow portion of the barge in FIGURE 18. Two or more propellers are used in this case due to the shallowness of the water and the need to have sufficient thrust of water expelled outwardly through louvered opening 169, which is provided with movable louvers 170 in a manner similar to the provision of louvers 83 and the louvered openings of the seagoing vessels. An appropriate valved opening 171 may be provided in the bottom of the barge in order to erode away the mud and sand on which a barge may have gone aground. In case of need these barges may be self-propelled using the propellers to force water out of opening 164.

Control for the devices of FIGURES 18 and 19 will be provided by precisely the same switch means and circuitry as the controls described above in connection with the seagoing vessels and control means for this installation need, therefore, not be again described. (See FIGURES 12 and 13.)

Referring again to the seagoing vessel of FIGURES 1, 2 and FIGURES 14 and 15, it will be apparent that if the vessel is proceeding slowly in a fog where the pilot cannot, in fact, see the landfalls necessary for safe navigation, it would be possible for the pilot to be guided by electronic devices conveying a signal to earphones mounted on his head, instructing him as to the location of the channel. The development of electronic devices, and electronic control of ships and airplanes has proceeded to the point where it can be stated that electronically controlled servomotors are available in the open market which could manipulate the joy sticks 132 and 132a by a signal from a remote position or by a signal from a cable laid along the bottom of the channel over which the vessel is to travel so that when the vessel tends to deviate from the channel to starboard or to port of the cable, the signal from the cable would activate the electronic servomotors to operate the control circuits of FIGURE 12 to cause the propellers in athwartships passages 14 and 15 to eject water to starboard or port as required to bring the vessel back on course.

In towing a barge, especially where the barge is heavy laden, the barge will often yaw, or swing from side to side. Even when the barge is provided with a steersman, it is very difficult to keep the barge in its proper place, and, in towing a barge in a crooked river, it is difficult to keep the barge in the channel.

If, however, the barge is provided with the athwartships passage 14 of FIGURE 3 or passage 166 of FIGURES 18 and 19, the jet of water from the athwartships passage may be used to move the bow of the barge in the direction of the tow boat.

FIGURE 26 shows a fairlead device to control the adjustable pitch propellers 36, 36', discussed above, in an athwartships passage 14 of the barge.

The prime mover that drives the adjustable pitch propeller is assumed to be rotating the propeller at a constant speed while the barge is being towed. The two adjustable reversible pitch propellers rotate at no pitch if the tow rope, passing through the fairlead of FIGURE 26 is in alignment with the barge, or if it is slack. The adjustable pitch propellers, however, are controlled by a switch 71a corresponding to the switches in FIGURES 11 and 12.

It will be seen in FIGURE 26 that a fairlead 180 is slidably mounted in a frame 181 that is secured to the prow of the barge so that the slide surfaces extend athwartships. Springs 182 and 183 bias the fairlead 180 to its normal centered position.

An extension 184, which may conveniently be provided with a bifurcated end projects downwardly to receive a pin 185 to starboard so the pitch of both propellers in passage 14 will be adjusted to provide a thrust of water to port which will counteract the yawing of the barge.

Similarly if the river curves to the left, the tow boat will, in pulling the bow of the barge to the left, move the fairlead 180, through which the tow rope passes, to port. Again the switch 71a activates the propeller adjusting motors so that a jet of water is expelled to the starboard to provide a thrust to move the bow of the barge to port, that is in the direction the tow boat is endeavoring to pull it.

FIGURE 27 shows that a barge, or the like, may also be controlled by an instrument that is not pushed or pulled by the tow rope itself, but rather is activated by a gyroscope 194 as shown in FIGURE 27.

It is not desired to have this instrument actuated by simple listings of the barge, but rather by bodily movement thereof, because its function, in monitoring (overriding) the reversible pitch propellers (maneuvering device) in the athwartship passage, is expressly for overcoming whip lash—common to trailing barge trains; therefore this gyroscopically controlled instrument 190 composed of an inner (instrument) housing 191 within a containing or outer shell 192 is centerly located (fixed) in the barge or vessel for minimum external interference. And its construction modified to further insure efficient operation.

The inner or functioning part of housing 191 is mounted on a floating pivot 193 which, while maintaining the housing 191 in a position parallel to the length of the barge, permits freedom of movement of the housing 191 on its axis. Between this housing 191 and the outer shell 192 and maintaining the position of the two housings, with relation to each other, are the pivot castors 199 operating in their track 200; making it possible also for end to end motion of housing 191.

The inner housing 191, with its mechanism and supports, is of air-tight construction, in perfect balance, and immersed in a fluid (lubricant) which fills the space between the two housings 191 and 192. Such fluid serves to absorb shock and to freely float the inner housing 191, thereby reducing the possibility of drag or friction on moving parts.

A gyroscope 194, driven by a gyro-operating motor, is hingedly mounted by a universal joint 195 at the top end of its shaft; while the lower end of the shaft which swings from the universal joint 195, under the influenced movement of the barge, is engaged by a frame 196 the primary purpose of which is to control the instrument's switch or switches 197 which actuate the reversible pitch propellers of the barge; when the barge train begins to whip-lash. At such time the control of the barge's reversible pitch propellers by the above described instrument overrides the fairland device shown in FIG. 26. Lesser purposes of the frame 196 are: restrictions of the range of the swinging lower shaft of gyroscope 194, and the shaft's protection by a spring arrangement 202 against interference by a strike or shock.

Gyroscope 198 shown at the left hand end of the housing 191, as seen in FIG. 27, holds the housing so that the hinge or universal joint 195 is always maintained at the top of the assemblage, even if the barge rocks, so that the device will not be affected by listing or rolling of the barge.

A switch means 197, as shown in FIG. 27 is provided. It will be seen then that when the barge changes position laterally, the lower end of the gyroscope 194 moves with respect to the switch or switches 197 which are secured so that the switch or switches 197 are actuated by the movement of the frame 196.

The switches, of course, are arranged to adjust propellers in the athwartship passage to correct the whip-lash movement of the barge.

As seen above, some of the objectives of this invention have been arrived at by providing controls to govern the ejection of water forcibly to one side or other of a vessel as required so that the vessel may be maneuvered in areas of great congestion. In all the above examples, an athwartships passage within the ship has been provided and ancillary propellers have been use. It is possible, however, as well be shown below, to use the same broad principle in connection with vessels such as ferryboats which conventionally provide a propeller at each end of the vessel.

In this case, in lieu of providing athwartships passages in each end of the ferryboat, dual rudders are provided as indicated in FIGURE 21.

At each end of the ferryboat there will be a conventional propeller 172 just outboard of which there are provided twin rudders 173 and 174, which, as indicated in FIGURE 22, may be turned to a suitable angle to steer the vessel in the normal manner. As will be seen from FIGURES 23, 24 and 25, these two rudders may assume positions which are not conventional, the condition noted in FIGURE 25 being designated as a hovering position. When using this position for the rudders, both rudders are turned inwardly so that the water from propeller 172 is deflected outwardly equally at both sides, this occurring at both ends of the vessel, the vessel will merely stay in place yet will be capable of being rapidly maneuvered. If the position of the rudders 173 and 174 is changed from that of FIGURE 25 to that of FIGURE 23 at each end of the ferryboat and in opposite directions, the ferryboat will rotate about its own center and if the rudders are moved to the positions of FIGURE 23 in the same direction at both ends of the vessel, the ferryboat will be moved bodily sideways. The operation of the rudders 173 and 174 is controlled by a handle 175 seen diagrammatically in FIGURE 20 which operates along a path or cam slot 176.

Handle 175 controls rudders 173 and 174 by moving racks 176 and 177 lengthwise to rotate gears 178 and 179 which are operatively connected to rudders 173 and 174. Racks 176 and 177 are connected to the handle by links 180 and 181. The path of handle 175 is determined by the length of links 180 and 181 and the angularity of the racks 176 and 177.

Assuming the rudders to be in the hovering position of FIGURE 25, which is duplicated in full lines in FIGURE 20, the rudders will move through the FIGURE 24 position to the FIGURE 3 position as the handle 175 is moved first to point A and then to point B. These positions of the rudders are shown in dotted lines adjacent points A and B on FIGURE 20. When the handle 175 is moved from position B to position C, the rudders 173 and 174 assume the parallelism of the normal steering range which extends from point C, FIGURE 22, on one side through point D amidships, FIGURE 21, to point E at the other side. Points F and G give positions of the rudder similar to those of positions B and A, respectively, but in the opposite sense. During normal operation in uncrowded waters, the handle 175 is moved between points C and E to steer the vessel as is the usual practice. If, however, it is required that the ship turn sharply, handle 175 may be moved from point C to point B to give a deflection of the water sharply to that side while concurrently the handle corresponding to handle 175 for control of the rudders at the other end of the ship will be moved to the position corresponding to position B or F to deflect water towards the other side of the vessel to give a rotary motion to the vessel. It will be seen from FIGURE 20 that extremes of steering ability are provided by this means to manipulate dual rudders on vessels such as ferryboats or the like.

Having thus described my invention, I therefore claim:

1. A maneuvering device for ships, barges, or the like comprising an athwartships passage near one end of the ship, a valved bottom opening in said ship connected to said athwartship passage, a louvered opening at each end of said passage, two adjustable, reversible-pitch propellers, one mounted at each end of said passage adjacent said louvered openings, a single means to simultaneously adjust the pitch of said propellers and switch means whereby the adjustment of the pitch of one of said propellers can be changed from adjustment in the same direction as the other propeller to adjustment in the opposite direction to the other propeller.

2. The maneuvering device of claim 1 in which the louvers of each said louvered opening are adjustable and are arranged to be selectively adjusted in unison in the same or in opposite directions to deflect water ejected through each said opening forwardly or rearwardly of the ship, said single means being operatively connectable to said louvers to simultaneously selectively adjust the said louvers.

3. The device of claim 2 including a second athwartships passage at the other end of the ship provided with a valved bottom opening, adjustable pitch propellers and adjustable louvers at each end of said athwartships passage, and a second single means to simultaneously adjust the pitch of said propellers and the said louvers of said second athwartships passage.

4. In the device of claim 1, the adjustable reversible pitch propeller comprising an inner first rotatable tubular element, a plurality of propeller blades each mounted to rotate on an axis forming a radius of said tubular element, the axis of each blade being provided exteriorly of said tubular element with a gear, a second tubular element surrounding said first tubular element and coaxial thereof, annular rack means secured to said second tubular element meshing with each gear of said blades whereby upon relative rotation between said first and second tubular elements said blades are turned about their axes whereby the pitch of said blades may be adjusted.

5. The device of claim 4 including a drive shaft geared to said inner tubular element, gear means geared to said outer tubular element rotatably mounted with respect to said drive shaft, spider means fixed to said gear means geared to said outer tubular element, a motor mounted to rotate with said spider means and differential gear means, comprising a gear secured to said drive shaft, a gear driven by said motor, and at least one gear secured for rotation on a pivot fixed to said spider means.

6. The device of claim 4 having a central tubular hub means in said propeller in which each blade is pivoted, radial openings in said tubular hub on each axial side of said blades, and spring biased valve means within said tubular hub means whereby unequal pressures axially of said blades may be equalized.

7. In combination, a ship hull having an engine, a transverse passage near each end of said hull below the waterline and having an amidship bottom opening connected to each said transverse passage, two reversible adjustable pitch propellers in each said transverse passage near its outboard ends driven by said engine, means to adjust each of said propellers, and a set of adjustable louver means at each end of each said transverse passage, said louvers being rotatable about vertical axes whereby water expelled by the propeller through said louver means may be selectively deflected to aid in maneuvering said ship, and handle operated control means for said propellers and said louvers for each said transverse passage, said control means including coupling means so that the propellers and louvres of each transverse passage may be controlled by a single handle, or so that the louvres and the propeller may be controlled by separate handles, and a manual switch for each said transverse passage to reverse the direction of adjustment of one of said propellers, and a manual switch for each said transverse passage to reverse the direction of adjustment of one of said sets of louvers.

8. The combination of claim 7 in which at least one longitudinal passage is provided extending the length of the ship between said transverse passages and sea valves are provided along said longitudinal passage whereby water may be expelled through the ship bottom to erode sand or the like on which the ship may be grounded.

9. In the combination of claim 8, said sea valves comprising two coaxial cylindrical elements, means to rotate said cylindrical elements in the ship independently of each other, the inner of said cylindrical elements being screw threaded on its outer surface, an extensible nozzle element threadedly engaging said inner element and slidably keyed to the outer said cylindrical element, whereby, upon relative rotation between the two cylindrical elements said extensible element may be extended.

10. The combination of claim 7 in which the adjustable louver elements are pivoted in a frame that is mounted so that the bottom of said frame may be swung away from the side of the ship, whereby water expelled by the propeller may be deflected downwardly to erode away mud or the like on which the ship may be grounded.

11. Control means for a barge being towed by a hawser said control means comprising an athwartships passage in the forward portion of said barge, at least one adjustable reversible pitch propeller in said athwartships passage, means including a switch to adjust the pitch of said propeller in one or other direction, said switch being controlled by a bar, a transversely slidable fairlead adapted to receive the hawser, said fairlead being resiliently biased to a normal central position and means cooperatively connecting said slidable fairlead to said bar controlling said switch whereby, a side stress exerted on said fairlead by said hawser will cause movement of said fairlead against said resilient bias to cause said switch to adjust said propeller to a pitch to relieve the side stress exerted by said hawser.

12. In a vessel having a power plant, at least one athwartships water filled passage adjacent one end of said vessel, a valved sea connection joining said athwartship passage, a pair of independently controlled reversible pitch propeller means, each positioned in said athwartship passage outboard of said valved sea connection, drive shaft means for each said reversible pitch propeller operatively connected to said power plant, a control stand including a handle, control means at said control stand for each of said reversible pitch propellers, and means coupling the control means for said reversible pitch propellers to said handle the means coupling the control means of one of said reversible pitch propellers being selectively reversible whereby said reversible pitch propellers may be simultaneously controlled for operation in unison or in opposition.

13. The vessel of claim 12 in which said valved sea connection lies in substantially the same horizontal plane as said athwartship passage.

14. The vessel of claim 12 including independently controlled sets of louvres, mounted on vertical pivots at the outboard ends of said athwartships passage, control means for said louvres positioned at said control stand, and coupling means coupling said control means for said louvres to said handle for simultaneously controlling said louvres.

15. The vessel of claim 14 including means to reverse the direction of adjustment of one of said sets of louvres.

16. A barge having an end, a bottom, and two adjacent sides, an end opening in said end below the waterline, a passage within said barge extending from said end opening, a side opening in each said side adjacent said end connected to said passage, vertically pivoted louvre elements in each said opening, a power plant, adjustable pitch propellers adjacent each said side opening within said passage operatively connected to said power plant, whereby said propellers may be operated to selectively expel water from, or draw water into said side openings, and control means operated by a single handle to control said propellers and said louvre elements.

References Cited by the Examiner
UNITED STATES PATENTS

| | | | |
|---|---|---|---|
| 943,604 | 12/09 | Montjustin | 144—151 X |
| 1,590,900 | 6/26 | Medynski | 114—148 |
| 1,782,167 | 11/30 | Greene | 170—160.48 |
| 2,330,674 | 9/43 | Briggs | 114—151 |
| 2,344,433 | 3/44 | West | 114—163 |
| 2,412,486 | 12/46 | Wilson | 114—144 |
| 2,505,071 | 4/50 | Stepanoff | 103—89 |
| 2,747,035 | 5/56 | Hansen et al. | 200—17 |
| 2,945,170 | 7/60 | Jones et al. | 318—489 |
| 2,985,740 | 5/61 | Fisher et al. | 200—157 |
| 3,002,486 | 10/61 | Jardmo | 114—148 |
| 3,008,443 | 11/61 | Blickle | 114—148 |
| 3,101,693 | 8/63 | Schilling | 114—163 |
| 3,137,265 | 6/64 | Meyerhoff | 318—489 |

MILTON BUCHLER, *Primary Examiner.*

ANDREW H. FARRELL, *Examiner.*